US008312167B2

(12) United States Patent
Swaminathan et al.

(10) Patent No.: US 8,312,167 B2
(45) Date of Patent: Nov. 13, 2012

(54) DISTRIBUTING DATA VIA A NETWORK INCLUDING TIMING INFORMATION

(75) Inventors: Viswanathan Swaminathan, Union City, CA (US); Gerard Fernando, Mountain View, CA (US); Michael Speer, Mtn View, CA (US)

(73) Assignee: Oracle America, Inc., Redwood City, CA (US)

( * ) Notice: Subject to any disclaimer, the term of this patent is extended or adjusted under 35 U.S.C. 154(b) by 483 days.

(21) Appl. No.: 11/146,357

(22) Filed: Jun. 6, 2005

(65) Prior Publication Data

US 2012/0266160 A1 Oct. 18, 2012

Related U.S. Application Data

(63) Continuation of application No. 09/614,996, filed on Jul. 11, 2000, now Pat. No. 7,185,102, which is a continuation of application No. 09/105,963, filed on Jun. 26, 1998, now Pat. No. 6,092,120.

(51) Int. Cl.
*G06F 15/16* (2006.01)
(52) U.S. Cl. .......................... 709/245; 709/231; 709/247
(58) Field of Classification Search .................. 709/230, 709/231, 236, 247, 203, 217, 219
See application file for complete search history.

(56) References Cited

U.S. PATENT DOCUMENTS

| | | | |
|---|---|---|---|
| 4,989,133 A | | 1/1991 | May et al. |
| 5,606,695 A | | 2/1997 | Dworzecki |
| 5,745,645 A | | 4/1998 | Nakamura et al. |
| 5,758,072 A | | 5/1998 | Filepp et al. |
| 5,835,668 A | * | 11/1998 | Yanagihara ..................... 386/95 |
| 5,854,873 A | | 12/1998 | Mori et al. |
| 5,884,004 A | | 3/1999 | Sato et al. |
| 5,907,372 A | * | 5/1999 | Oku et al. ..................... 348/716 |
| 6,018,771 A | * | 1/2000 | Hayden ........................ 709/231 |
| 6,031,584 A | | 2/2000 | Gray |
| 6,047,027 A | * | 4/2000 | Miyagosi et al. ........ 375/240.28 |
| 6,057,886 A | * | 5/2000 | Van Gestel ..................... 725/54 |

(Continued)

FOREIGN PATENT DOCUMENTS

EP 789359 A2 * 8/1997

(Continued)

OTHER PUBLICATIONS

Schulzrinne et al., RFC 1889, "RTP: A Transport Protocol for Real-Time Applications," 75 pages, Jan. 1996.

(Continued)

*Primary Examiner* — Mohamed Ibrahim
(74) *Attorney, Agent, or Firm* — Meyertons Hood Kivlin Kowert & Goetzel, P.C.; Jeffrey C. Hood

(57) ABSTRACT

A method and apparatus for timely delivery of classes and objects is provided. A header comprising timing information is attached to said classes and/or objects. A "start loading" time and a "load by" time are specified in the header. Other classes and/or objects to be loaded are also specified in the header. Optional compression, security, and/or error resilience schemes are also specified in the header. A process for creating the header and attaching it to a class or object is provided. A process for receiving and processing a class or object with an attached header is provided. Embodiments of the invention allow timely delivery of classes and/or objects over a wide variety of transport mechanisms, including unreliable transport mechanisms and those lacking any guarantees of timely delivery.

70 Claims, 9 Drawing Sheets

U.S. PATENT DOCUMENTS

| | | | | |
|---|---|---|---|---|
| 6,134,603 | A * | 10/2000 | Jones et al. | 719/330 |
| 6,157,948 | A | 12/2000 | Inoue et al. | |
| 6,173,317 | B1 * | 1/2001 | Chaddha et al. | 709/219 |
| 6,181,713 | B1 * | 1/2001 | Patki et al. | 370/474 |
| 6,195,701 | B1 * | 2/2001 | Kaiserswerth et al. | 709/231 |
| 6,208,665 | B1 * | 3/2001 | Loukianov et al. | 370/486 |
| 6,282,578 | B1 * | 8/2001 | Aizono et al. | 719/310 |
| 6,292,827 | B1 * | 9/2001 | Raz | 709/217 |
| 6,493,767 | B1 * | 12/2002 | Ishida et al. | 709/249 |
| 6,502,137 | B1 * | 12/2002 | Peterson et al. | 709/229 |
| 2001/0054184 | A1 | 12/2001 | Watanabe et al. | |

FOREIGN PATENT DOCUMENTS

| | | |
|---|---|---|
| JP | 7-231308 | 8/1995 |
| JP | 9-006695 | 1/1997 |
| JP | 9-191453 | 7/1997 |
| JP | 10-164530 | 6/1998 |
| WO | WO 98 11723 | 3/1998 |

OTHER PUBLICATIONS

Advanced Streaming Format—White Paper, "ASF: A universal container file format for synchronized media," Microsoft Corporation, retrieved from Internet at www.microsoft.com/asf/whitepr/asfwp.htm, Jan. 1998.

Bolot, "RTP: The Real-Time Transport Protocol," Oct. 1996, 11 pgs.

European Search Report, Application No. EP 02006229.5, mailed Nov. 28, 2002.

European Search Report, Application No. EP 02006233.7, mailed Nov. 28, 2002.

European Search Report, Application No. EP 99304835.4, mailed Nov. 28, 2002.

Lindholm et al., "The Java™ Virtual Machine Specification," The Java Series from the Source, Chapter 3 & 4, Sep. 1996.

Machine Translation of JP 7-231308; Tomoyuki Yamamoto, et al; Aug. 29, 1995; 89 pages.

Machine Translation of JP 10-164530; Shigeaki Watanabe, et al; Jun. 19, 1998; 101 pages.

Machine Translation of JP 9-191453; Hided Haraguchi, et al; Jul. 22, 1997; 47 pages.

European Search Report; Ref. P006944.EP MJH; Nov. 28, 2002; 3 pages.

European Search Report; Ref. P006944EPA SRD; Nov. 28, 2002; 3 pages.

European Search Report; Ref. P006944EPB SRD; Nov. 28, 2002; 3 pages.

P.A. Sarginson; MPEG-2: Overview of the Systems Layer; British Broadcasting Corporation; 1996; 17 pages.

"Virtual Machine"; Wikipedia article; http://en.wikipedia.org/w/index.php?title=Virtual_machine&printable=yes; Accessed Nov. 13, 2009.

* cited by examiner

DISTRIBUTING DATA VIA A NETWORK INCLUDING TIMING INFORMATION

CONTINUATION DATA

This application is a continuation of U.S. patent application Ser. No. 09/614,996 titled "Method for Handling Byte Code in a Configurable Manner" filed Jul. 11, 2000 now U.S. Pat. No. 7,185,102, which is a continuation of U.S. patent application Ser. No. 09/105,963 titled "Method and Apparatus for Timely Delivery of a Byte Code and Serialized Objects Stream" filed Jun. 26, 1998, which has issued as U.S. Pat. No. 6,092,120. U.S. Pat. No. 6,092,120 and application Ser. No. 09/614,996 are both hereby incorporated by reference in their entirety as though fully and completely set forth herein.

BACKGROUND OF THE INVENTION

1. Field of the Invention

This invention relates to the field of computer software, and, more specifically, to object-oriented computer applications.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever. Sun, Sun Microsystems, the Sun logo, Solaris, SPARC, "Write Once, Run Anywhere", Java, JavaOS, JavaStation and all Java-based trademarks and logos are trademarks or registered trademarks of Sun Microsystems, Inc. in the United States and other countries.

2. Background Art

With advancements in network technology, the use of networks for facilitating the distribution of media information, such as text, graphics, and audio, has grown dramatically, particularly in the case of the Internet and the World Wide Web. One area of focus for current developmental efforts is in the field of web applications and network interactivity. In addition to passive media content, such as HTML definitions, computer users or "clients" coupled to the network are able to access or download application content, in the form of applets, for example, from "servers" on the network.

To accommodate the variety of hardware systems used by clients, applications or applets are distributed in a platform-independent format such as the Java™ class file format. Object-oriented applications are formed from multiple class files that are accessed from servers and downloaded individually as needed. Class files contain bytecode instructions. A "virtual machine" process that executes on a specific hardware platform loads the individual class files and executes the bytecodes contained within.

A problem with the class file format and the class loading process is that no mechanism is provided to ensure timely delivery of class files. The timing of the storage, transfer and processing of the individual class files is thus not scheduled or guaranteed to occur within a particular time frame. Also, an application may contain many class files, all of which are loaded and processed in separate transactions. Thus, a delay in the delivery of even one class file slows down the application and degrades performance.

These problems can be understood from a review of general object-oriented programming and an example of a current network application environment.

Object-Oriented Programming

Object-oriented programming is a method of creating computer programs by combining certain fundamental building blocks, and creating relationships among and between the building blocks. The building blocks in object-oriented programming systems are called "objects." An object is a programming unit that groups together a data structure (one or more instance variables) and the operations (methods) that can use or affect that data. Thus, an object consists of data and one or more operations or procedures that can be performed on that data. The joining of data and operations into a unitary building block is called "encapsulation."

An object can be instructed to perform one of its methods when it receives a "message." A message is a command or instruction sent to the object to execute a certain method. A message consists of a method selection (e.g., method name) and a plurality of arguments. A message tells the receiving object what operations to perform.

One advantage of object-oriented programming is the way in which methods are invoked. When a message is sent to an object, it is not necessary for the message to instruct the object how to perform a certain method. It is only necessary to request that the object execute the method. This greatly simplifies program development.

Object-oriented programming languages are predominantly based on a "class" scheme. The class-based object-oriented programming scheme is generally described in Lieberman, "Using Prototypical Objects to Implement Shared Behavior in Object-Oriented Systems," OOPSLA 86 Proceedings, September 1986, pp. 214-223.

A class defines a type of object that typically includes both variables and methods for the class. An object class is used to create a particular instance of an object. An instance of an object class includes the variables and methods defined for the class. Multiple instances of the same class can be created from an object class. Each instance that is created from the object class is said to be of the same type or class.

To illustrate, an employee object class can include "name" and "salary" instance variables and a "set_salary" method. Instances of the employee object class can be created, or instantiated for each employee in an organization. Each object instance is said to be of type "employee." Each employee object instance includes "name" and "salary" instance variables and the "set_salary" method. The values associated with the "name" and "salary" variables in each employee object instance contain the name and salary of an employee in the organization. A message can be sent to an employee's employee object instance to invoke the "set_salary" method to modify the employee's salary (i.e., the value associated with the "salary" variable in the employee's employee object).

A hierarchy of classes can be defined such that an object class definition has one or more subclasses. A subclass inherits its parent's (and grandparent's etc.) definition. Each subclass in the hierarchy may add to or modify the behavior specified by its parent class. Some object-oriented programming languages support multiple inheritance where a subclass may inherit a class definition from more than one parent class. Other programming languages support only single inheritance, where a subclass is limited to inheriting the class definition of only one parent class. The Java™ programming language also provides a mechanism known as an "interface" which comprises a set of constant and abstract method declarations. An object class can implement the abstract methods defined in an interface. Both single and multiple inheritance are available to an interface. That is, an interface can inherit an interface definition from more than one parent interface.

An object is a generic term that is used in the object-oriented programming environment to refer to a module that contains related code and variables. A software application can be written using an object-oriented programming language whereby the program's functionality is implemented using objects.

Java™ Programming and Execution

A Java™ program is composed of a number of classes and interfaces. Unlike many programming languages, in which a program is compiled into machine-dependent, executable program code, Java™ classes are compiled into machine independent bytecode class files. Each class contains code and data in a platform-independent format called the class file format. The computer system acting as the execution vehicle contains a program called a virtual machine, which is responsible for executing the code in Java™ classes. The virtual machine provides a level of abstraction between the machine independence of the bytecode classes and the machine-dependent instruction set of the underlying computer hardware. A "class loader" within the virtual machine is responsible for loading the bytecode class files as needed, and either an interpreter executes the bytecodes directly, or a "just-in-time" (JIT) compiler transforms the bytecodes into machine code, so that they can be executed by the processor.

Sample Java™ Network Application Environment

FIG. 1 is a block diagram illustrating a sample Java™ network environment comprising a client platform 102 coupled over a network 101 to a server 100 for the purpose of accessing Java™ class files for execution of a Java™ application or applet.

In FIG. 1, server 100 comprises Java™ development environment 104 for use in creating the Java™ class files for a given application. The Java™ development environment 104 provides a mechanism, such as an editor and an applet viewer, for generating class files and previewing applets. A set of Java™ core classes 103 comprise a library of Java™ classes that can be referenced by source files containing other/new Java™ classes. From Java™ development environment 104, one or more Java™ source files 105 are generated. Java™ source files 105 contain the programmer readable class definitions, including data structures, method implementations and references to other classes. Java™ source files 105 are provided to Java™ compiler 106, which compiles Java™ source files 105 into compiled ".class" files 107 that contain bytecodes executable by a Java™ virtual machine. Bytecode class files 107 are stored (e.g., in temporary or permanent storage) on server 100, and are available for download over network 101.

Client platform 102 contains a Java™ virtual machine (JVM) 111 which, through the use of available native operating system (O/S) calls 112, is able to execute bytecode class files and execute native O/S calls when necessary during execution.

Java™ class files are often identified in applet tags within an HTML (hypertext markup language) document. A web server application 108 is executed on server 100 to respond to HTTP (hypertext transport protocol) requests containing URLs (universal resource locators) to HTML documents, also referred to as "web pages." When a browser application executing on client platform 102 requests an HTML document, such as by forwarding URL 109 to web server 108, the browser automatically initiates the download of the class files 107 identified in the applet tag of the HTML document. Class files 107 are typically downloaded from the server and loaded into virtual machine 111 individually as needed.

It is typical for the classes of a Java™ program to be loaded as late during the program's execution as possible; they are loaded on demand from the network (stored on a server), or from a local file system, when first referenced during the Java™ program's execution. The virtual machine locates and loads each class file, parses the class file format, allocates memory for the class's various components, and links the class with other already loaded classes. This process makes the code in the class readily executable by the virtual machine.

Timely Delivery

There are a variety of applications for which Java™ byte code or serialized objects need to be delivered to clients in a timely fashion. For example, ensuring timely delivery of byte code is essential when Java™ byte code is used to control time aware media in a push scenario.

Currently, there has been no mechanism available for delivery of byte code in a timely fashion. Currently, the techniques for delivery of byte code use Transmission Control Protocol (TCP) to transmit byte code from servers to clients. TCP does not ensure timely delivery of information.

There are a number of schemes (e.g., Motion Picture Experts Group (MPEG) standards, such as MPEG-1, MPEG-2, MPEG-4, etc.) available for preparing time-sensitive data (e.g., audio, video, etc.) for transmission as media streams. Similarly, there are a number of schemes like Real-time Transport Protocol (RTP) and MPEG-2 transport stream, to deliver "time aware" media streams in a timely manner. "Time aware" information is information that carries with it additional information representing timing relevant to the use of the information. For example, information that includes time stamps indicating deadlines by which the information should be processed in certain ways is considered "time aware" information.

However, such techniques are designed to deliver media stream, such as audio and video data, not executable byte code. Media streams typically comprise information that is inherently tolerant of corruption or loss of integrity. For example, transient corruption of a few milliseconds of audio or video data creates only a brief distraction for a listener or viewer. However, the slightest corruption of executable byte code can prevent proper execution.

Moreover, one class file of byte code is often dependent upon other class files for proper execution. Existing techniques for timely delivery of media streams do not include provisions for these dependencies. Thus, a technique is needed to provide timely delivery of byte code.

A technique is needed to transform the class file (or a serialized object) into a time aware stream. If the Java™ byte code stream were made time aware, other real time transport mechanisms like RTP could be used to transport the stream in a timely fashion. Such a scheme would facilitate the use of byte code in any multicast or broadcast scenario. This would make it possible to transmit byte code using internet protocols like User Datagram Protocol (UDP). Without such a scheme UDP is unsuitable for delivery of byte code since UDP is an unreliable protocol (one that does not guarantee delivery of data). Transmission of byte code over an unreliable protocol could result in loss of portions of the byte code, which would prevent the byte code from executing properly.

SUMMARY OF THE INVENTION

A method and apparatus for providing timely delivery of a byte code stream is described. Embodiments of the invention avoid the disadvantages of existing transport techniques. For example, untimeliness and unreliability of delivery are avoided.

Embodiments of the invention enable timely delivery of Java™ byte code in a multicast/broadcast scenario with or without a back channel. The same mechanisms can also be used for delivering (serialized) objects. Multicasting allows transmission of a specially addressed data stream to many users. With multicasting, the data stream does not need to be individually transmitted to each user. Rather, the users can subscribe to the multicasting service, for example by specifying the address of the specially addressed data stream. Broadcasting allows transmission to users without the subscription process of multicasting.

Embodiments of the invention are suitable for use with "push" media, where information is transmitted to users without the need for users to request the information. "Push" media can be transmitted even in environments where there is no back channel to allow the users to communicate back to the source of the media. Embodiments of the invention are also suitable for use with "pull" media, where users request information from the source of the media.

Embodiments of the invention serve to make the Java™ byte code (in a class file) "time aware". To ensure timely delivery of byte code, the appropriate deadlines are carried along with the content as time stamps to the clients. These time stamps are used in a header to facilitate such a delivery mechanism. The header is attached to the byte code to allow timely delivery of the byte code stream.

One aspect of transmission that is addressed in timely delivery of byte code is that of packet loss. Prior techniques have provided no way of recovering from a packet loss in the case of Java™ byte code streaming. One possible approach involves retransmission of the entire class at regular intervals in the absence of a back channel. This would help to facilitate random access points in the case of media. However, this may not be possible when the number of clients is too high or when the class (or object) is very large, making retransmission prohibitive.

When a back channel is present packet loss can be signalled to the server, and the lost packet can be retransmitted. When a reliable multicast scheme is used, the data can also be retransmitted from places other than the server.

There are a number of error resilient schemes with in built redundancy available for recovering from a partial packet loss. For example, schemes like forward error correction can be used. The packet loss problem can also be partially solved by using some reliable multicast scheme. Embodiments of the invention facilitate the use of any error resilience or any reliable multicast algorithm to overcome packet loss.

Another aspect that is addressed is that of security. To ensure the safety of the client, the byte code needs to authentic. There are a number of security schemes that can be used to ensure the authenticity of the byte code. Embodiments of the invention also accommodate the use of any security scheme within the security model in the Java™ security APIs.

A further aspect that is addressed is that of compression. Compression increases the efficiency of delivery by reducing the time required to transmit a given amount of information. A number of compression schemes, such as LZW, LZS, etc., are available to compress class files for efficiency.

DETAILED DESCRIPTION OF THE INVENTION

The invention provides a method and apparatus for providing timely delivery of a byte code stream. In the following description, numerous specific details are set forth in order to provide a more thorough understanding of the present invention. It will be apparent, however, to one skilled in the art, that the present invention may be practiced without these specific details. In other instances, well-known features have not been described in detail in order not to unnecessarily obscure the present invention.

Embodiment of Computer Execution Environment (Hardware)

Figure 1:
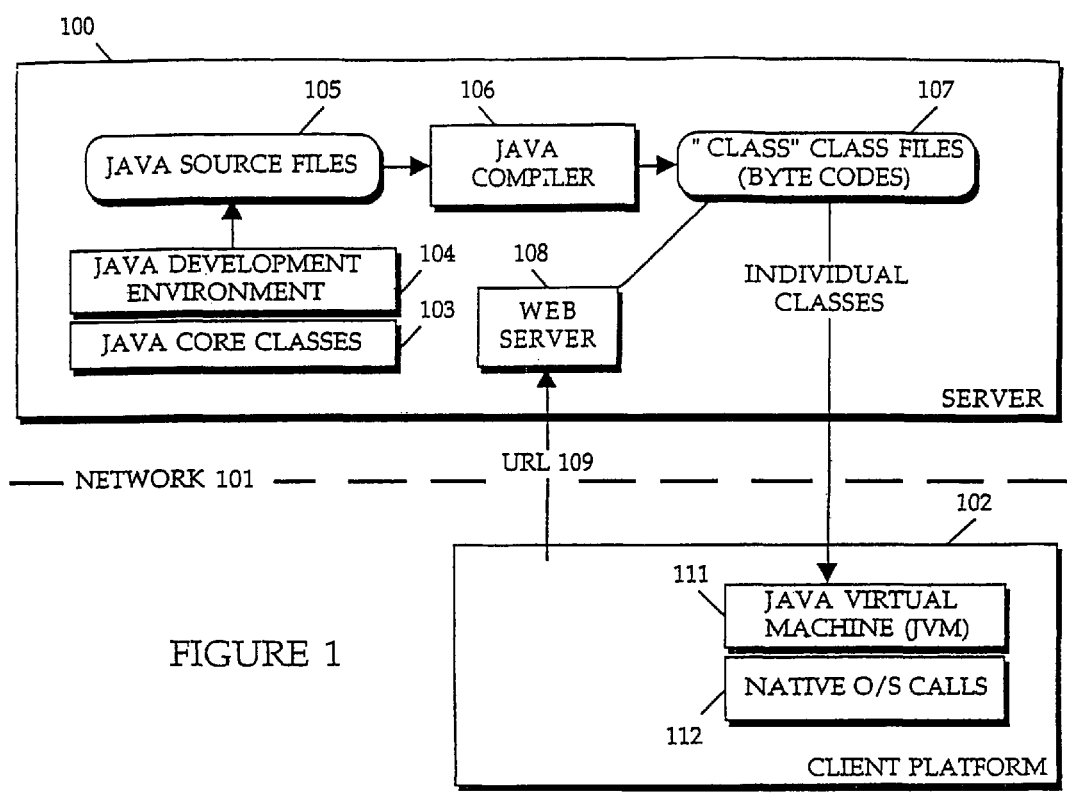
FIG. 1 is an embodiment of a Java™ network application environment.
Figure 2:
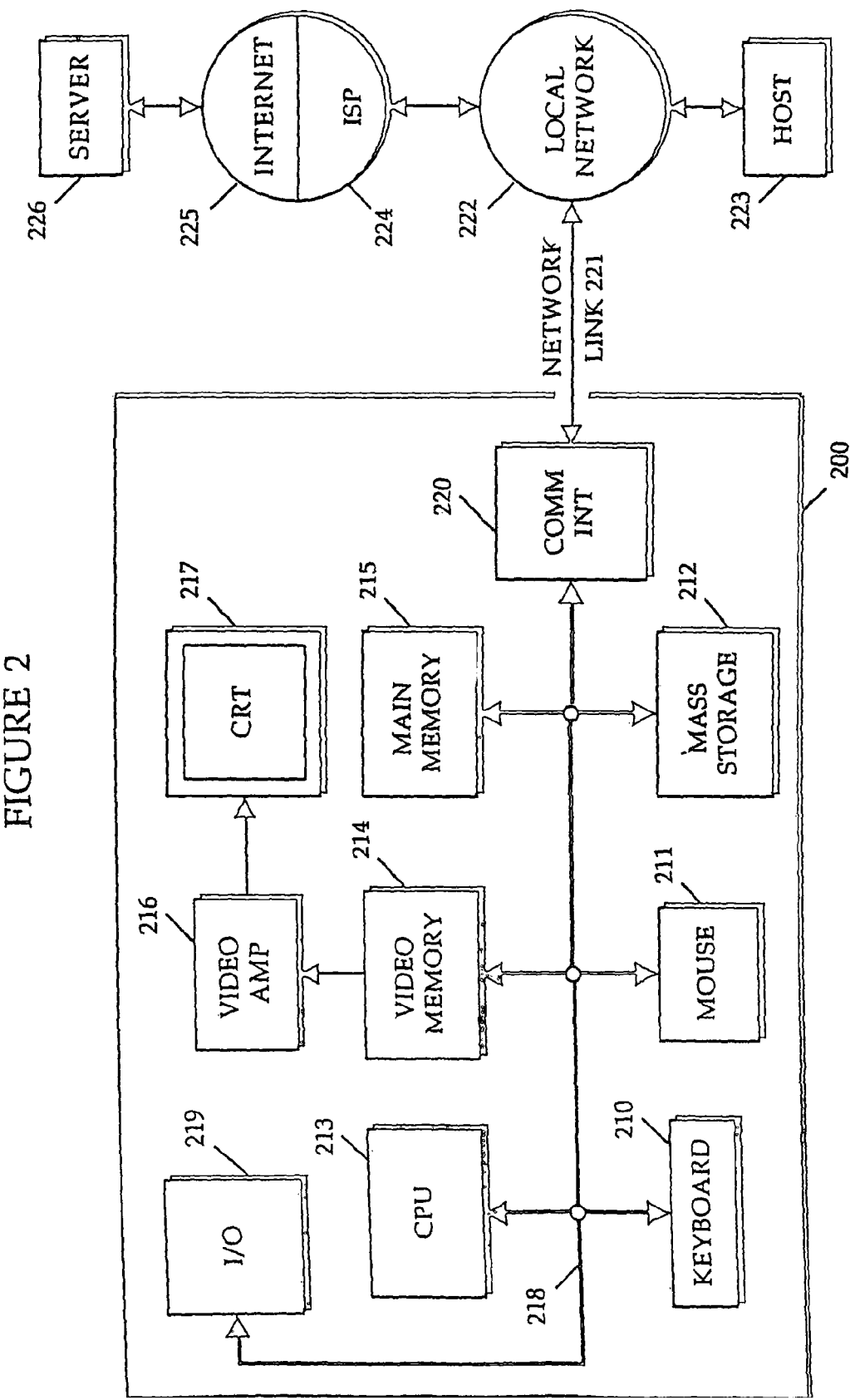
FIG. 2 is a block diagram of an embodiment of a computer system capable of providing a suitable execution environment for an embodiment of the invention.

An embodiment of the invention can be implemented as computer software in the form of computer readable program code executed on a general purpose computer such as computer 200 illustrated in FIG. 2, or in the form of bytecode class files executable by a virtual machine running on such a computer. A keyboard 210 and mouse 211 are coupled to a bi-directional system bus 218. The keyboard and mouse are for introducing user input to the computer system and communicating that user input to central processing unit (CPU) 213. Other suitable input devices may be used in addition to, or in place of, the mouse 211 and keyboard 210. I/O (input/output) unit 219 coupled to bi-directional system bus 218 represents such I/O elements as a printer, A/V (audio/video) I/O, etc.

Computer 200 includes a video memory 214, main memory 215 and mass storage 212, all coupled to bi-directional system bus 218 along with keyboard 210, mouse 211 and CPU 213. The mass storage 212 may include both fixed and removable media, such as magnetic, optical or magnetic optical storage systems or any other available mass storage technology. Bus 218 may contain, for example, thirty-two address lines for addressing video memory 214 or main memory 215. The system bus 218 also includes, for example, a 32-bit data bus for transferring data between and among the components, such as CPU 213, main memory 215, video memory 214 and mass storage 212. Alternatively, multiplex data/address lines may be used instead of separate data and address lines.

In one embodiment of the invention, the CPU 213 is a microprocessor manufactured by Motorola®, such as the 680X0 processor or a microprocessor manufactured by Intel®, such as the 80X86, or Pentium® processor, or a SPARC® microprocessor from Sun Microsystems®. However, any other suitable microprocessor or microcomputer may be utilized. Main memory 215 is comprised of dynamic random access memory (DRAM). Video memory 214 is a dual-ported video random access memory. One port of the video memory 214 is coupled to video amplifier 216. The video amplifier 216 is used to drive the cathode ray tube (CRT) raster monitor 217. Video amplifier 216 is well known in the art and may be implemented by any suitable apparatus. This circuitry converts pixel data stored in video memory 214 to a raster signal suitable for use by monitor 217. Monitor 217 is a type of monitor suitable for displaying graphic images.

Computer 200 may also include a communication interface 220 coupled to bus 218. Communication interface 220 provides a two-way data communication coupling via a network link 221 to a local network 222. For example, if communication interface 220 is an integrated services digital network (ISDN) card or a modem, communication interface 220 provides a data communication connection to the corresponding type of telephone line, which comprises part of network link 221. If communication interface 220 is a local area network (LAN) card, communication interface 220 provides a data communication connection via network link 221 to a compatible LAN. Wireless links are also possible. In any such implementation, communication interface 220 sends and receives electrical, electromagnetic or optical signals which carry digital data streams representing various types of information.

Network link 221 typically provides data communication through one or more networks to other data devices. For example, network link 221 may provide a connection through local network 222 to host computer 223 or to data equipment operated by an Internet Service Provider (ISP) 224. ISP 224 in turn provides data communication services through the world wide packet data communication network now commonly referred to as the "Internet" 225. Local network 222 and Internet 225 both use electrical, electromagnetic or optical signals which carry digital data streams. The signals through the various networks and the signals on network link 221 and through communication interface 220, which carry the digital data to and from computer 200, are exemplary forms of carrier waves transporting the information.

Computer 200 can send messages and receive data, including program code, through the network(s), network link 221, and communication interface 220. In the Internet example, server 226 might transmit a requested code for an application program through Internet 225, ISP 224, local network 222 and communication interface 220. In accord with the invention, one such downloaded application is the apparatus for pre-processing and packaging class files described herein.

The received code may be executed by CPU 213 as it is received, and/or stored in mass storage 212, or other non-volatile storage for later execution. In this manner, computer 200 may obtain application code in the form of a carrier wave.

The computer systems described above are for purposes of example only. An embodiment of the invention may be implemented in any type of computer system or programming or processing environment.

Class File Structure

Embodiments of the invention can be better understood with reference to aspects of the class file format. Description is provided below of the Java™ class file format. Additional description of the Java™ class file format can be found in Chapter 4, "The class File Format," and Chapter 5, "Constant Pool Resolution," of *The Java™ Virtual Machine Specification*, by Tim Lindholm and Frank Yellin, published by Addison-Wesley in September 1996, ©Sun Microsystems, Inc.

The Java™ class file consists of a stream of 8-bit bytes, with 16-bit, 32-bit and 64-bit structures constructed from consecutive 8-bit bytes. A single class or interface file structure is contained in the class file. This class file structure appears as follows:

```
ClassFile {
    u4 magic;
    u2 minor_version;
    u2 major_version;
    u2 constant_pool_count;
    cp_info constant_pool[constant_pool_count-1];
    u2 access_flags;
    u2 this_class;
    u2 super_class;
    u2 interfaces_count;
    u2 interfaces[interfaces_count];
    u2 fields_count;
    field_info fields[fields_count];
    u2 methods_count;
    method_info methods[methods_count];
    u2 attributes_count;
    attribute_info attributes[attributes_count];
}
``` where u2 and u4 refer to unsigned two-byte and four-byte quantities. This structure is graphically illustrated in FIG. 3.

Figure 3:
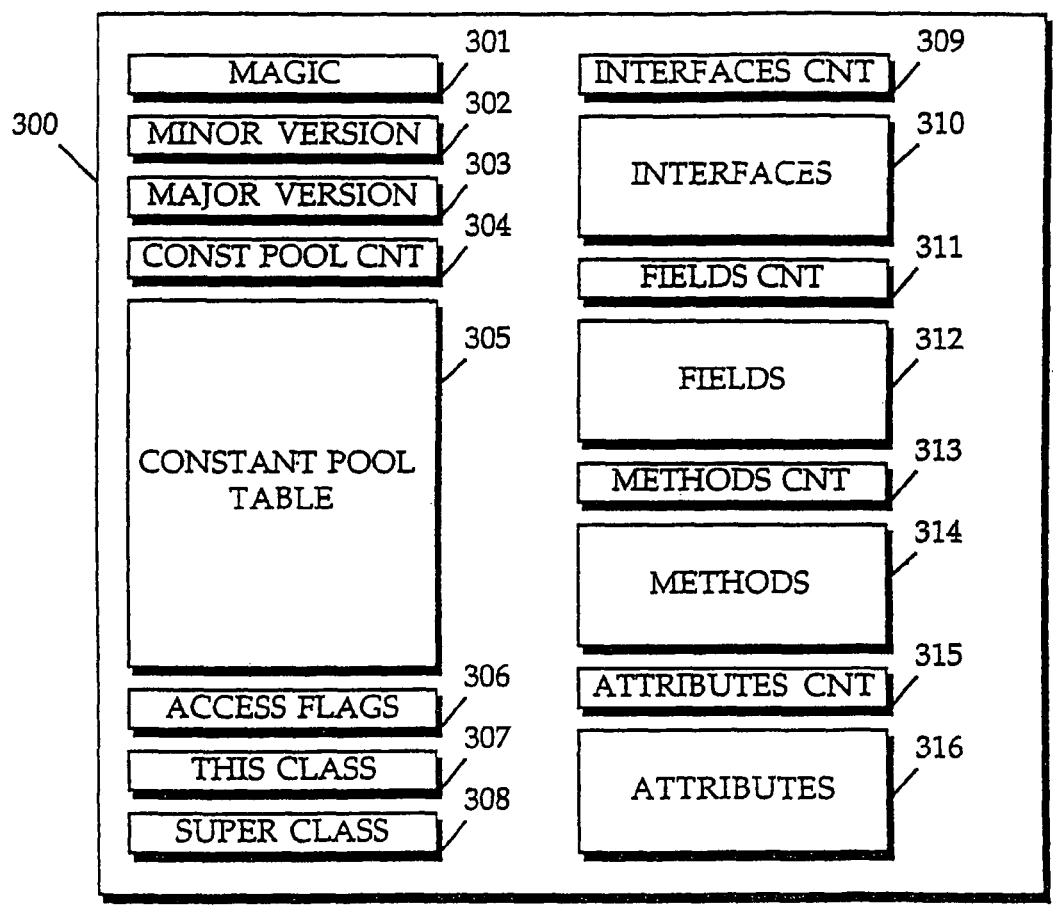
FIG. 3 is a block diagram of an embodiment of a class file format.

In FIG. 3, class file 300 comprises four-byte magic value 301, two-byte minor version number 302, two-byte major version number 303, two-byte constant pool count value 304, constant pool table 305 corresponding to the constant pool array of variable length elements, two-byte access flags value 306, two-byte "this class" identifier 307, two-byte super class identifier 308, two-byte interfaces count value 309, interfaces table 310 corresponding to the interfaces array of two-byte elements, two-byte fields count value 311, fields table 312 corresponding to the fields array of variable length elements, two-byte methods count value 313, methods table 314 corresponding to the methods array of variable length elements, two-byte attributes count value 315, and attributes table 316 corresponding to the attributes array of variable-length elements. Each of the above structures is briefly described below.

Magic value 301 contains a number identifying the class file format. For the Java™ class file format, the magic number has the value 0xCAFEBABE. The minor version number 302 and major version number 303 specify the minor and major version numbers of the compiler responsible for producing the class file.

The constant pool count value 304 identifies the number of entries in constant pool table 305. Constant pool table 305 is a table of variable-length data structures representing various string constants, numerical constants, class names, field names, and other constants that are referred to within the ClassFile structure. Each entry in the constant pool table has the following general structure:

```
cp_info {
    u1 tag;
    u1 info[ ];
}
``` where the one-byte "tag" specifies a particular constant type. The format of the info[ ] array differs based on the constant type. The info[ ] array may be a numerical value such as for integer and float constants, a string value for a string constant, or an index to another entry of a different constant type in the constant pool table. Further details on the constant pool table structure and constant types are available in Chapter 4 of *The Java™ Virtual Machine Specification* (supra).

Access flags value 306 is a mask of modifiers used with class and interface declarations. The "this class" value 307 is an index into constant pool table 305 to a constant type structure representing the class or interface defined by this class file. The super class value 308 is either zero, indicating the class is a subclass of java.lang.Object, or an index into the constant pool table to a constant type structure representing the superclass of the class defined by this class file.

Interfaces count value 309 identifies the number of direct superinterfaces of this class or interface, and accordingly, the number of elements in interfaces table 310. Interfaces table 310 contains two-byte indices into constant pool table 305. Each corresponding entry in constant pool table 305 is a constant type structure representing an interface which is a direct superinterface of the class or interface defined by this class file.

The fields count value 311 provides the number of structures in fields table 312. Each entry in fields table 312 is a variable-length structure providing a description of a field in the class type. Fields table 312 includes only those fields that are declared by the class or interface defined by this class file.

The methods count value 313 indicates the number of structures in methods table 314. Each element of methods table 314 is a variable-length structure giving a description of, and virtual machine code for, a method in the class or interface.

The attributes count value 315 indicates the number of structures in attributes table 316. Each element in attributes table 316 is a variable-length attribute structure. Attribute structures are discussed in section 4.7 of Chapter 4 of *The Java™ Virtual Machine Specification* (supra).

Embodiments of the invention enable timely delivery of Java™ byte code in a multicast/broadcast scenario with or without a back channel. The same mechanisms can also be used for delivering (serialized) objects. Multicasting allows transmission of a specially addressed data stream to many users. With multicasting, the data stream does not need to be individually transmitted to each user. Rather, the users can subscribe to the multicasting service, for example by specifying the address of the specially addressed data stream. Broadcasting allows transmission to users without the subscription process of multicasting.

Embodiments of the invention are suitable for use with "push" media, where information is transmitted to users without the need for users to request the information. "Push" media can be transmitted even in environments where there is no back channel to allow the users to communicate back to the source of the media. Embodiments of the invention are also suitable for use with "pull" media, where users request information from the source of the media.

Embodiments of the invention serve to make the Java™ byte code (in a class file) "time aware". To ensure timely delivery of byte code, the appropriate deadlines are carried along with the content as time stamps to the clients. These time stamps are used in a header to facilitate such a delivery mechanism. The header is attached to the byte code to allow timely delivery of the byte code stream.

One aspect of transmission that is addressed in timely delivery of byte code is that of packet loss. Prior techniques have provided no way of recovering from a packet loss in the case of Java™ byte code streaming. One possible approach involves retransmission of the entire class at regular intervals in the absence of a back channel. This would help to facilitate random access points in the case of media. However, this may not be possible when the number of clients is too high or when the class (or object) is very large, making retransmission prohibitive.

When a back channel is present packet loss can be signalled to the server, and the lost packet can be retransmitted. When a reliable multicast scheme is used, the data can also be retransmitted from places other than the server.

There are a number of error resilient schemes with in built redundancy available for recovering from a partial packet loss. For example, schemes like forward error correction can be used. The packet loss problem can also be partially solved by using some reliable multicast scheme. Embodiments of the invention facilitate the use of any error resilience or any reliable multicast algorithm to overcome packet loss.

Another aspect that is addressed is that of security. To ensure the safety of the client, the byte code needs to be authentic. There are a number of security schemes that can be used to ensure the authenticity of the byte code. Embodiments of the invention also accommodate the use of any security scheme within the security model in the Java security APIs.

A further aspect that is addressed is that of compression. Compression increases the efficiency of delivery by reducing the time required to transmit a given amount of information. A number of compression schemes, such as LZW, LZS, etc., are available to compress class files for efficiency.

Figure 5:
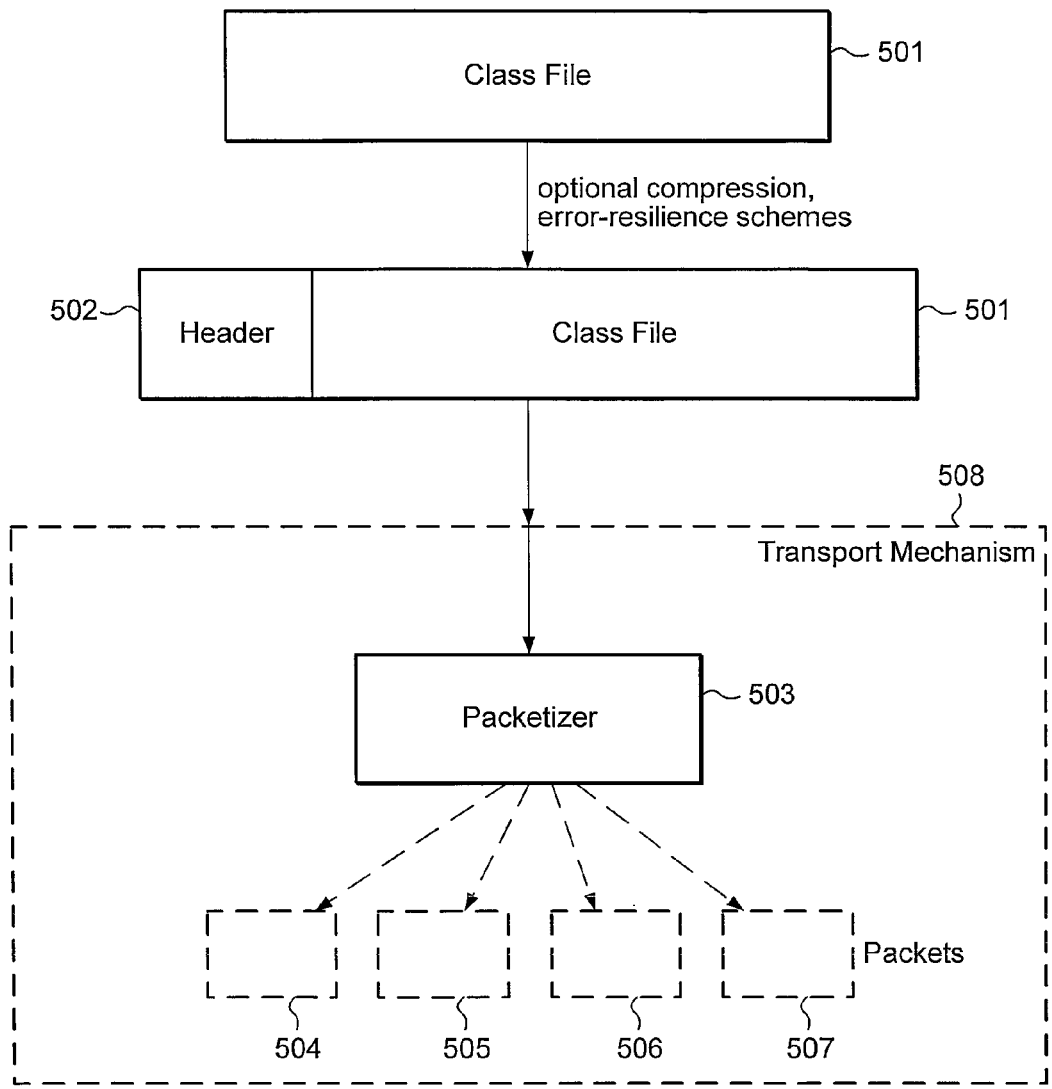
FIG. 5 is a schematic diagram illustrating a technique for delivery of class files in a timely manner according to one embodiment of the invention.

FIG. 5 is a schematic diagram illustrating a technique for delivery of class files in a timely manner according to one embodiment of the invention. Class file (or object) 501 is provided. Class file (or object) 501 may or may not be processed according to one or more suitable optional compression, error-resilience, and security schemes. Header 502 is added to the class file (or object) 501. Class file (or object) 501 with header 502 is passed to transport mechanism 508 for delivery elsewhere. Transport mechanism 508 uses packetizer 503 to transport class file (or object) 501 with header 502 as a series of packets 504, 505, 506, and 507. Transport mechanism 508 determines the appropriate number of packets in which to transport any given class file (or object) 501 with header 502.

Figure 4:
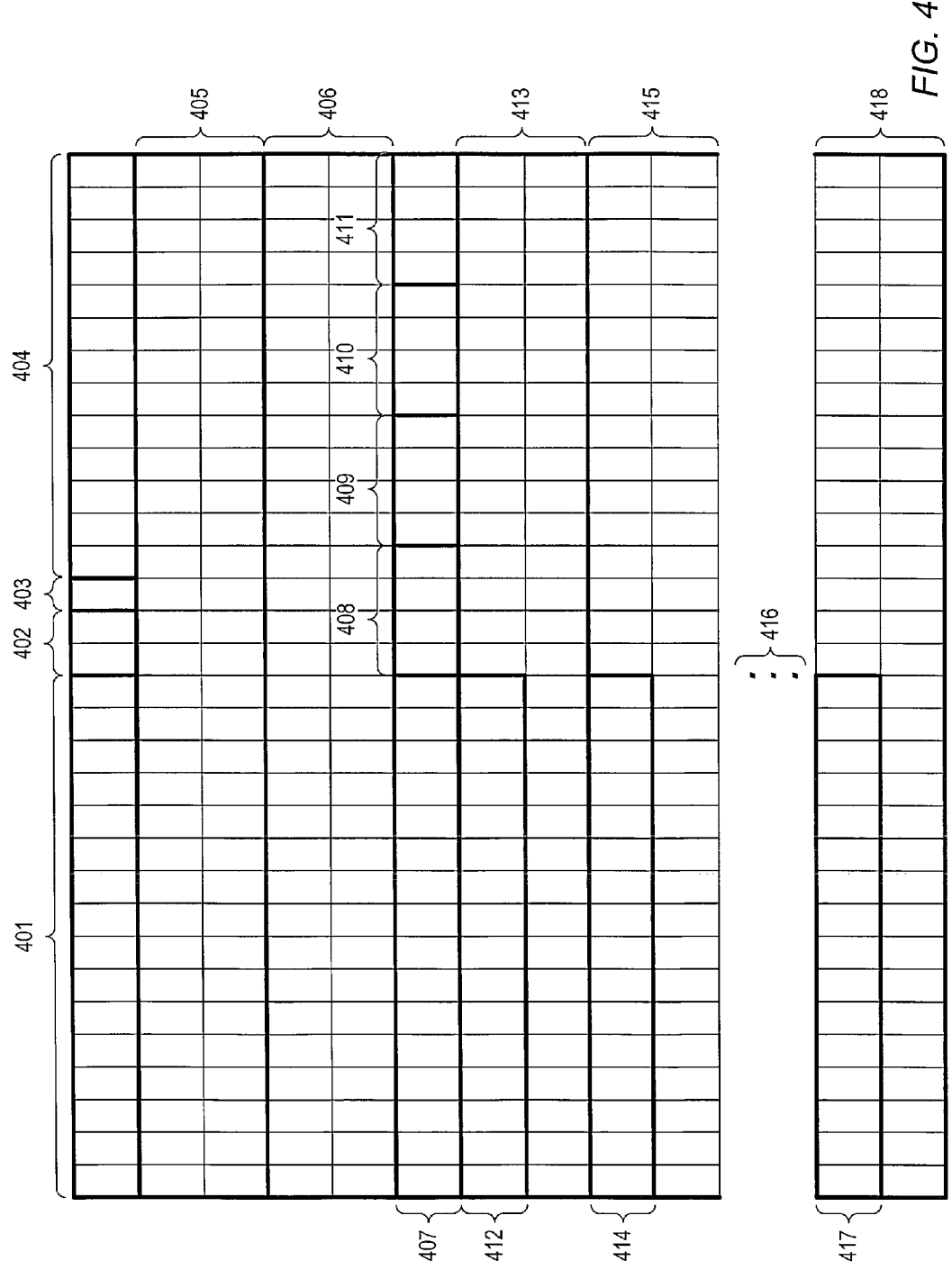
FIG. 4 is a diagram illustrating a header for class files or (serialized) objects to ensure timely delivery according to one embodiment of the invention.

FIG. 4 is a diagram illustrating a header for class files or (serialized) objects to ensure timely delivery according to one embodiment of the invention. This header, shown as a byte code header, is attached to the class file before it is packetized as illustrated in FIG. 5. After packetization, any "time aware" transport mechanism (e.g., RTP, MPEG-2 transport stream, etc.) can be used to transport the data to the client side. This scheme can be adopted for any particular media content (e.g., MPEG-1, MPEG-2, etc.) and transport mechanism (MPEG-2 transport stream, RTP, etc.) by defining the tables for compression, security, and error resiliency schemes.

One embodiment of a header comprises information representing the length of the header, the version, a flag denoting a class or an object, the number of required classes, a "start loading" time stamp, a "load by" time stamp, the size of the class, the type of compression being used, the type of security scheme being used, the type of error correction being used, other type information, the length of the class identifier (ID), the class identifier (ID), the lengths of the class ID for each of the required classes, and the class IDs for each of the required classes.

One embodiment of length of header information 401 comprises 16 bits denoting the size in bytes of the header added to the byte code file to provide timely delivery. One embodiment of version information 402 comprises two bits denoting the version of the scheme used to provide timely delivery of the byte code file. One embodiment of class/object flag 403 comprises one bit denoting whether the byte code file to which the header is appended is a class or an object. For example, a one represents a class while a zero represents an object.

One embodiment of the number of required classes information 404 comprises 13 bits denoting the number of classes that are required before loading this class (or before instantiation, in case of objects). One embodiment of the "start loading" time stamp 405 comprises 64 bits denoting the time after which class loading can begin once the class has been received and re-assembled completely. The length of the time stamps are set to 64 bits to accommodate NTP time stamps. Time stamps of fewer bits are padded with extra bits to fill the 64-bit length. Each scheme can define the location of the decimal point to represent fractional time stamps. In cases where clock ticks are used (MPEG-2), all 64 bits can be used.

The time stamps may comprise representations of absolute or relative time. For example, the time stamps may represent the actual time of day or some other absolute measurement of time, or the time stamps may represent the time elapsed since the beginning of a session, the occurrence of an event, or some other relative measurement of time.

One embodiment of the "load by" time stamp 406 comprises 64 bits denoting the time by which the class has to be loaded absolutely. One embodiment of the size of class information 407 comprises 16 bits denoting the size in bytes of the data that is being transmitted.

One embodiment of the invention comprises type fields. Compress type field 408 comprises 4 bits to specify the type of compression used (0000 for objects or when no compression is used). Security type 409 field comprises 4 bits to specify the security scheme used (0000 if none used). Error correction type field 410 comprises 4 bits to specify the error correction scheme used (0000 if none used). Type field 411 comprises 4 bits that are reserved for future use.

One embodiment of class ID length information 412 comprises 32 bits denoting the length in bytes of class ID information 413. Class ID information 413 comprises a variable length string that identifies the classes (unique to each session). The string is padded so that the length of the combination of class ID length information 412 and class ID information 413 is a multiple of 32 bits.

One embodiment of the header also comprises the class IDs and their lengths for each of the required classes. Class ID 1 length information 414 comprises 16 bits of information denoting the length of the class ID for the first required class. Class ID 1 information 415 comprises a variable length string that identifies the first required class and that is padded so that the combined length of class ID 1 length information 414 and class ID 1 information 415 is a multiple of 32 bits.

Class ID length information and class ID information for required classes beyond the first required class follow class ID 1 information 415 and occupy region 416. Class ID n length information 417 comprises 16 bits and specifies the length of the class ID for the nth required class. Class ID n information 418 comprises a variable number of bits that identify the nth required class and are padded to the next 32 bit boundary.

In one embodiment of the invention, each class is packaged as a separate unit. Thus, a header is appended to each class to enable timely delivery. Timely delivery is facilitated by providing a time frame within which the class is to be loaded. A "start loading" time stamp is provided for each class to indicate the time after which that class can be loaded. A "load by" time stamp is provided for each class to indicate the time by which each class needs to be loaded. The "load by" time stamp provides the guaranteed time after which the class can be expected to be available at the application.

The payload delivered by this scheme can be classes (compressed or uncompressed) or instances. To provide efficient, secure, and reliable There are three type fields in the header, which specify the attributes of the data (class or object).

Any suitable compression scheme may be used in conjunction with an embodiment of the present invention. A portion (e.g., 4 bits) of the header is designated to provide identification of the type of compression scheme used. For example, the bit pattern 0000 is used to denote no compression, while the bit patterns 0001 through 1111 are used to denote specific compression techniques.

Any suitable security scheme may be used in conjunction with an embodiment of the present invention. A portion (e.g., 4 bits) of the header is designated to provide identification of the type of security scheme used. For example, the bit pattern 0000 is used to denote no use of a security scheme, while the bit patterns 0001 through 1111 are used to denote specific security schemes.

Any suitable error resiliency scheme may be used in conjunction with an embodiment of the present invention. A portion (e.g., 4 bits) of the header is designated to provide identification of the type of error resiliency scheme used. For example, the bit pattern 0000 is used to denote no use of an error resiliency scheme, while the bit patterns 0001 through 1111 are used to denote specific error resiliency schemes. A portion (e.g., 4 bits) of the header is reserved for future use.

One benefit of the use of an error resiliency scheme is that unreliable protocols, such as UDP, may be used to transmit byte code. Byte code that is incomplete or that has been affected by errors will not execute properly. Unreliable protocols, such as UDP, do not guarantee complete and error-free delivery of information. However, the addition of an error resiliency scheme allows completeness to be verified and errors to be corrected before byte code is executed. Thus, the transmission of byte code is no longer constrained to only reliable transport mechanisms.

Classes are identified by an ID, which is unique to the session. This ID can be used to identify classes when it is received multiple times. This can be used by objects to identify the class of which each is an instance. Java™ class names are used as ID's. Since these are variable length strings, the length of the string is also included in the header. The combination of the Class ID and its length (16 bits) are padded to the next 32-bit boundary.

Embodiments of the invention also provide a list of required classes. The "load by" time of each required class needs to be before the "start loading" time of a class that requires it. A 13-bit number is used to specify the number of classes that are required before loading/instantiating the class/object data. The required classes are specified by their Class ID's (along with the length of their class ID's).

Figure 6:
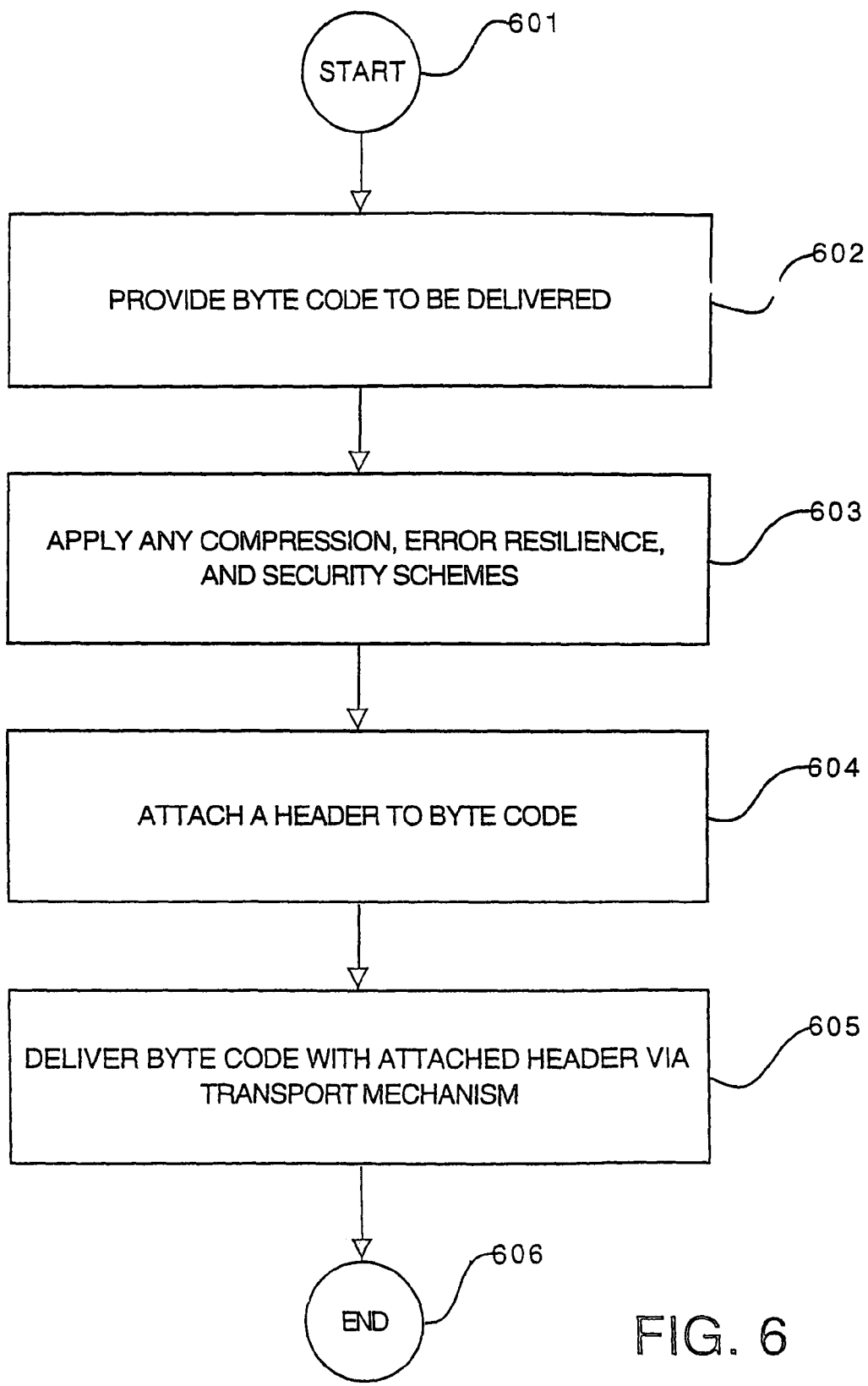
FIG. 6 is a flow diagram illustrating a process by which byte code is prepared for timely delivery according to one embodiment of the invention.

FIG. 6 is a flow diagram illustrating a process by which byte code is prepared for timely delivery according to one embodiment of the invention. The process begins in step 601. In step 602, the byte code to be delivered is provided. In step 603, any desired compression, error resilience, and security schemes are performed on the byte code. Any combination of compression, error resilience, and security schemes may be performed in any order. For example, a security schemes may be applied, followed by an error resilience scheme without the use of a compression. Thus, any permutation of compression, error resilience, security schemes, or subsets thereof may be used. In step 604, a header is attached to the byte code. The header comprises information about the byte code. One embodiment of such a header is described with respect to FIG. 4 above. Although the header is described as being attached to the byte code such that the header information precedes the byte code, the header can be located at any position with respect to the byte code, for example, at the end of the byte code, between portions of the byte code, or interleaved with the byte code.

In step 605, the byte code with the attached header is delivered via a transport mechanism. Any suitable transport mechanism may be used. For example, a transport mechanism that, by itself, guarantees delivery, but does not guarantee the timing of delivery, such as TCP, may be used. Alternatively, a transport mechanism that guarantees timeliness, such as RTP, may be used. As another alternative, a transport mechanism that does not guarantee delivery, such as UDP, may be used. In step 606, the process ends.

Figure 7A:
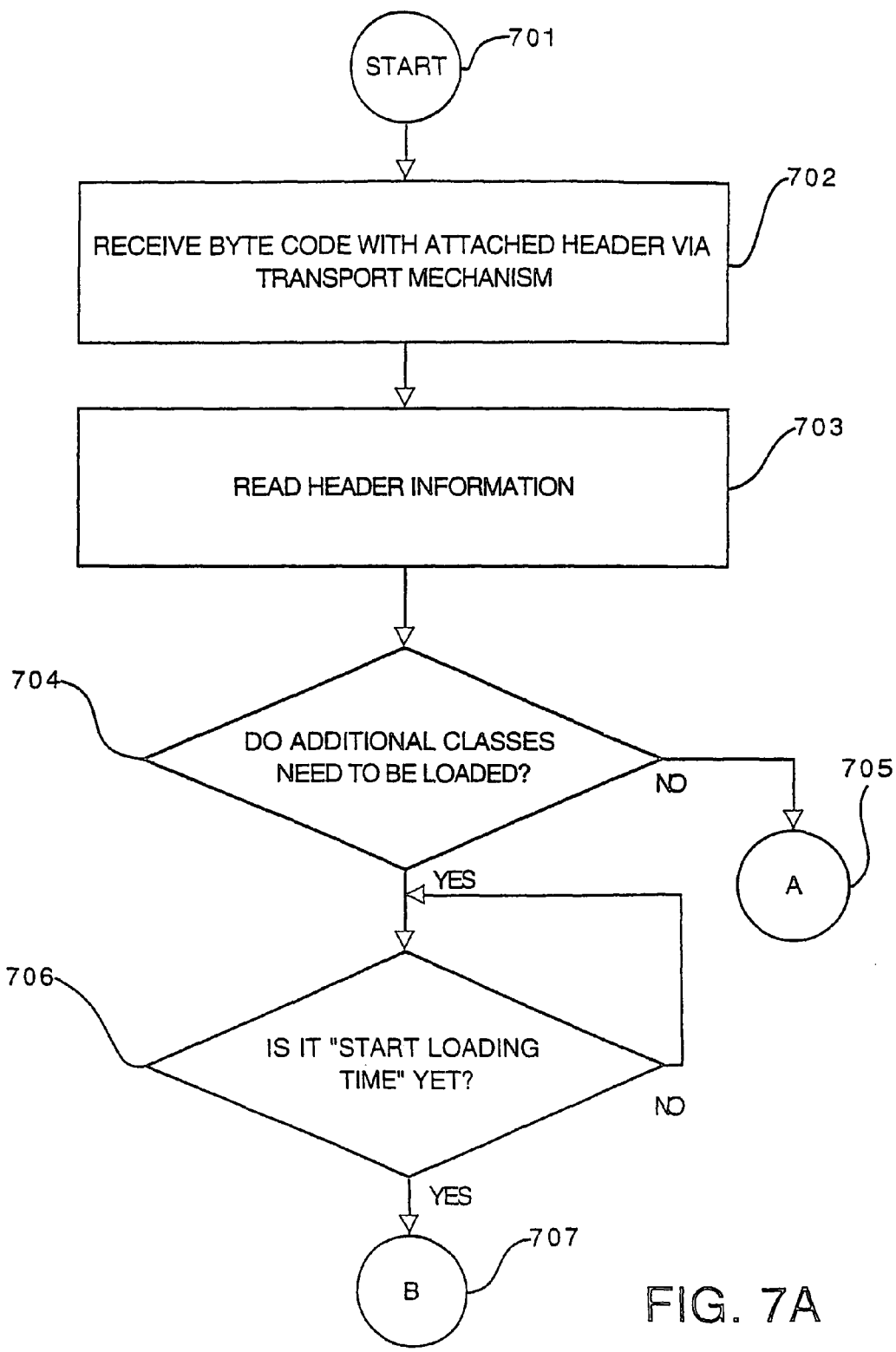
FIGS. 7A and 7B are flow diagrams illustrating a process by which byte code is received and used in a timely manner according to one embodiment of the invention.
Figure 7B:
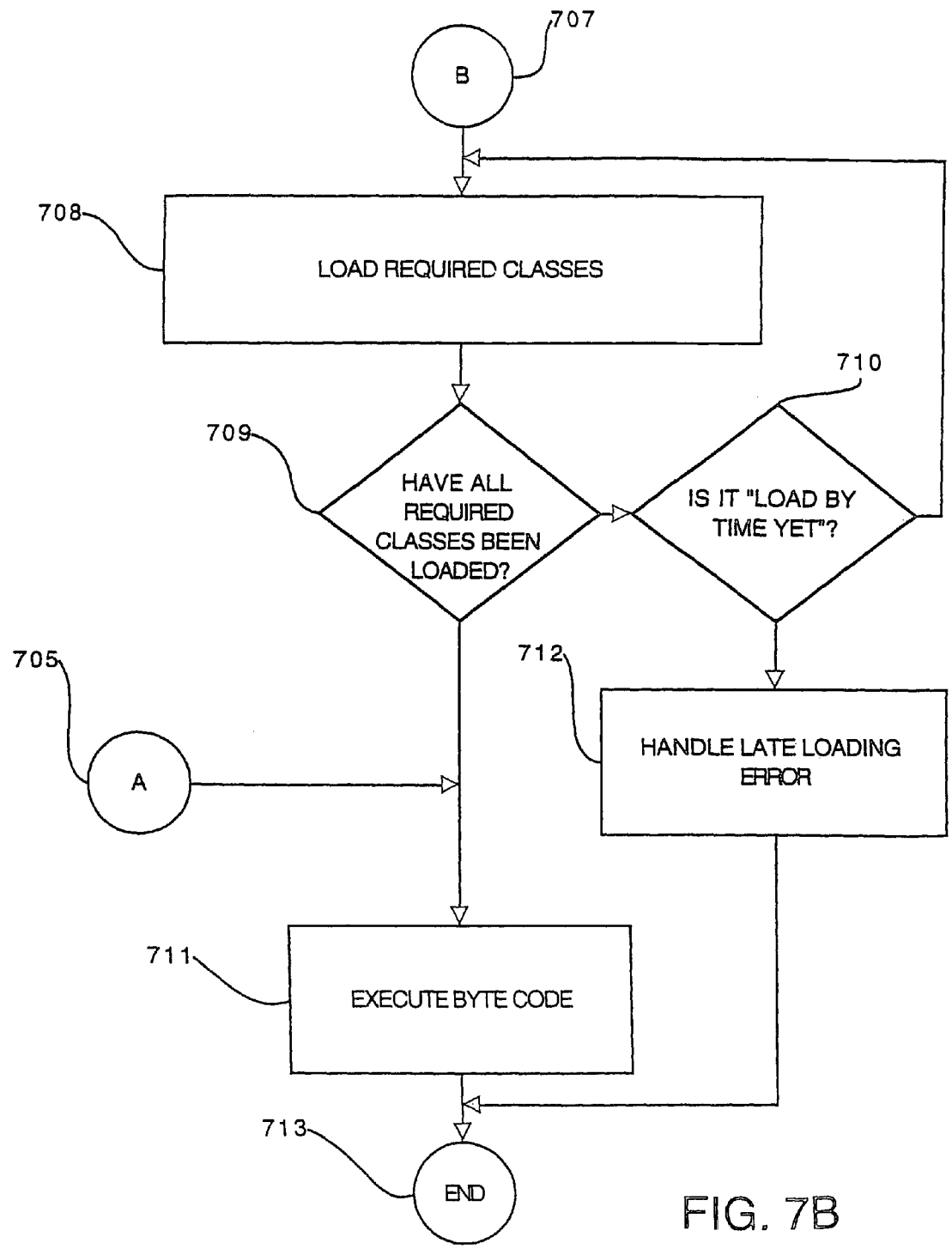

FIGS. 7A and 7B are flow diagrams illustrating a process by which byte code is received and used in a timely manner according to one embodiment of the invention. The process begins in step 701. In step 702, the byte code with the attached header is received via a transport mechanism. The transport mechanism may be any suitable transport mechanism. In step 703, the information contained in the header is read. In step 704, a decision is made as to whether or not additional classes need to be loaded before the byte code can be executed. Information used to make this determination may be extracted from the header. If additional classes need to be loaded, the process continues in step 706.

In step 706, a decision is made as to whether or not the "start loading time" specified in the header has passed yet. If not, the process returns to step 706 and waits until the "start loading time" has arrived. If the "start loading time" has arrived, the process continues in step 708 via reference B 707. In step 708, the required classes are loaded. In step 709, a decision is made as to whether or not all required classes have been loaded. If not, the process continues to step 710. In step 710, a decision is made as to whether or not the "load by time" specified in the header has passed. If the "load by time" has not passed, the process returns to step 708, where the loading of required classes continues. If, in step 710, the "load by time" has already passed, the process continues to step 712. In step 712, the late loading error is handled. The late loading error handling may comprise notification that the required classes could not be loaded successfully by the "load by time" deadline. Based on this notification, a decision can be made as to whether the loading should be rescheduled (for example, by specifying a new "load by time" deadline or whether the loading process should be cancelled (without execution of the byte code). From step 712, the process ends in step 713.

Figure 8:
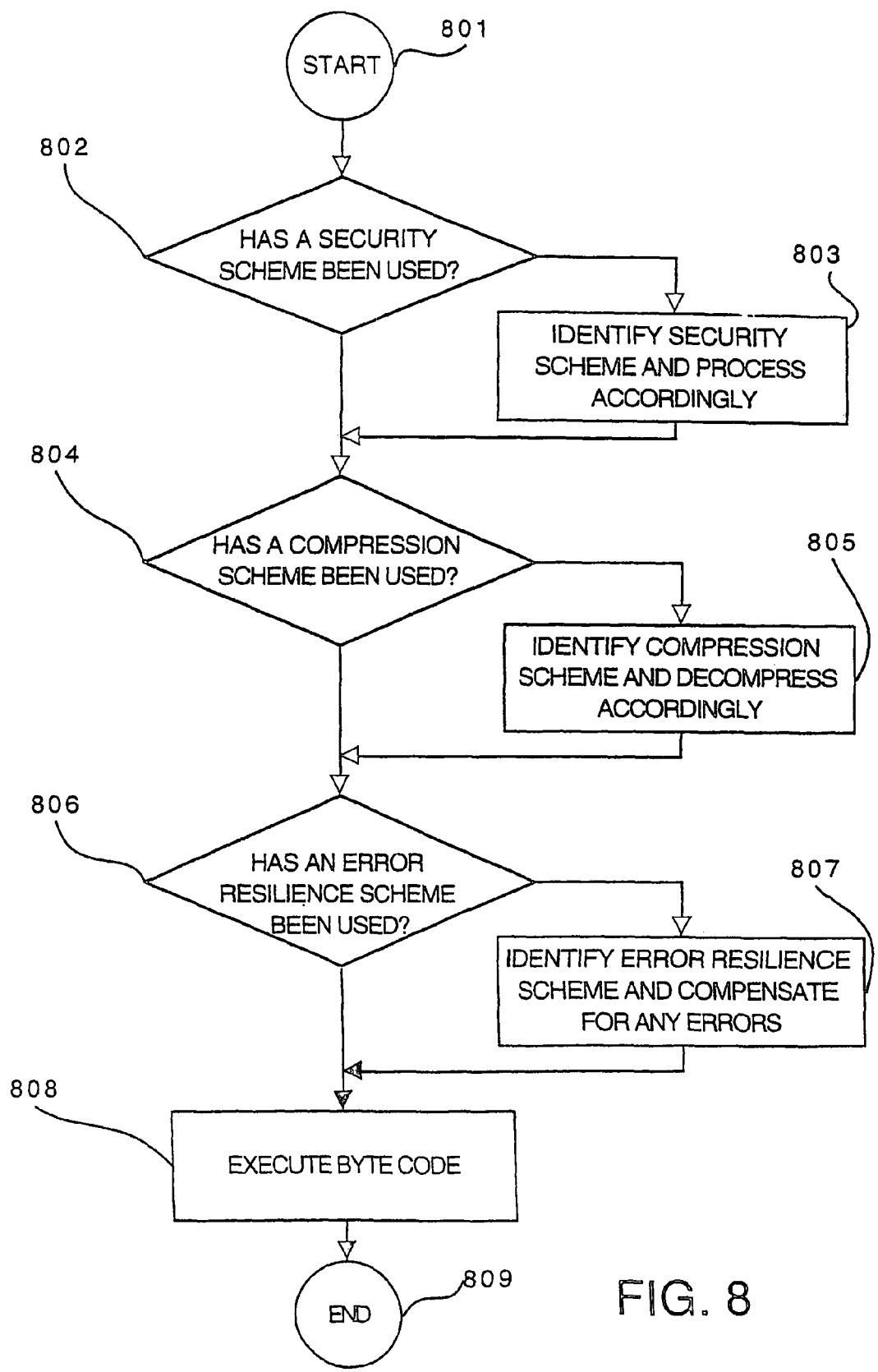
FIG. 8 is a flow diagram illustrating a process by which delivered byte code is prepared for execution and executed according to one embodiment of the invention.

If in step 709, all required classes have been loaded, the process continues in step 711. Also, if in step 704, no additional classes needed to be loaded, the process continues in step 711 via reference A 705. In step 711, the byte code is executed. The execution of the byte code may involve additional steps if security, compression, and/or error resilience schemes have been performed on the byte code. An example of a process comprising certain additional steps is illustrated in FIG. 8. From step 711, the process ends in step 713.

FIG. 8 is a flow diagram illustrating a process by which delivered byte code is prepared for execution and executed according to one embodiment of the invention. The process begins in step 801. In step 802, a decision is made as to whether or not a security scheme has been used. If a security scheme has been used, the process continues to step 803. In step 803, the security scheme that has been used is identified and the byte code is processed according to that security scheme. Identification of the security scheme may be performed based on information found in the header information, such as that read in step 703. From step 803, the process continues to step 804. If, in step 802, it is determined that no security scheme was used, the process continues in step 804.

In step 804, a decision is made as to whether or not a compression scheme has been used. If a compression scheme has been used, the process continues to step 805. In step 805, the compression scheme that was used is identified and the byte code is decompressed according to that compression scheme. Identification of the compression scheme may be performed based on information found in the header information, such as that read in step 703. From step 805, the process continues in step 806. If, in step 804, it is determined that no compression scheme has been used, the process continues in step 806.

In step 806, a decision is made as to whether or not an error resilience scheme has been used. If an error resilience scheme has been used, the process continues to step 807. In step 807, the error resilience scheme that was used is identified and any errors or omissions that may have occurred are corrected or compensated. Identification of the compression scheme may be performed based on information found in the header information, such as that read in step 703. From step 806, the process continues in step 808. If, in step 806, it is determined that no error resilience scheme was used, the process continues in step 808.

In step 808, the byte code is executed. Since one embodiment of the invention provides a mechanism for insuring that all required classes have been loaded before attempting execution of the byte code, successful execution of the byte code is provided. In step 809, the process ends.

Thus, a method and apparatus for providing timely delivery of a byte code stream has been described in conjunction with one or more specific embodiments. The invention is defined by the claims and their full scope of equivalents.

The invention claimed is:

1. A computer-implemented method for distributing data via a computer network, the method comprising:
   a first computer system addressing the data to one or more network addresses; and
   the first computer system transmitting the data to the computer network using the one or more network addresses, wherein the one or more network addresses include a broadcast address;
   wherein the data includes program instructions and timing information, wherein the program instructions define one or more platform-independent computer programs that are executable by a virtual machine on a second computer system that is coupled to the computer network; and
   wherein the timing information indicates a time by which loading of at least a first portion of the program instructions is to be completed by the virtual machine on the second computer system;
   wherein said transmitting the data includes broadcasting the data to a plurality of computer systems via the computer network without separately addressing each of the plurality of computer systems, wherein said broadcasting the data uses the broadcast address.

2. The method of claim 1, wherein the first portion of the program instructions includes a reference to a second portion of the program instructions; and
   wherein the timing information indicates a time by which loading of the second portion of the program instructions is to be completed by the second computer system.

3. The method of claim 2, wherein said transmitting the data to the computer network includes transmitting the second portion of the program instructions two or more times to the computer network.

4. The method of claim 3, wherein the timing information further indicates a time that the second computer system is to start loading the second portion of the program instructions.

5. The method of claim 3, wherein said transmitting the second portion of the program instructions two or more times includes periodically transmitting the second portion of the program instructions.

6. The method of claim 1, wherein said first portion of the program instructions includes byte code.

7. The method of claim 6, wherein the byte code includes an object or a class.

8. The method of claim 6, wherein the byte code conforms to the Java™ Virtual Machine Specification.

9. The method of claim 6, wherein the byte code is part of an applet.

10. The method of claim 1, wherein said transmitting the data to the computer network includes transmitting the first portion of the program instructions two or more times to the computer network.

11. The method of claim 10, wherein said transmitting the first portion of the program instructions two or more times includes periodically transmitting the first portion of the program instructions to the computer network.

12. The method of claim 1, wherein at least the first portion of the program instructions is compressed prior to said transmitting the data.

13. The method of claim 12, wherein the data further includes compression type information, wherein the compression type information specifies a type of compression used to compress said at least the first portion of the program instructions.

14. The method of claim 1, wherein the computer network includes at least one wireless link.

15. The method of claim 1, wherein the one or more network addresses include a multicast address; and
wherein said transmitting the data includes transmitting the data to a plurality of computer systems via the computer network without separately addressing each of the plurality of computer systems, wherein said transmitting the data to the plurality of computer systems uses the multicast address.

16. The method of claim 1, further comprising dividing the data into a plurality of data packets before said addressing and said transmitting;
wherein said addressing the data to one or more network addresses includes addressing each of the plurality of data packets to the one or more network addresses; and
wherein said transmitting the data includes transmitting each of the plurality of data packets to the computer network.

17. The method of claim 1, wherein the timing information further indicates a time that the second computer system is to start loading the first portion of the program instructions.

18. The method of claim 1, wherein the data further includes media information, wherein the media information includes one or more of audio information, image information, and video information, wherein the media information is time-aware media information.

19. The method of claim 1, wherein the data is formatted according to a Real-time Transport Protocol (RTP).

20. The method of claim 1, wherein the data further includes authentication information which is usable by the second computer system to authenticate at least said first portion of the program instructions.

21. The method of claim 1, wherein the first portion of the program instructions belongs to a first class, wherein the data includes a header associated with the first class, wherein the header includes the timing information and a list of additional classes required by the first class.

22. The method of claim 1, wherein the data includes a header, wherein the header includes the timing information, wherein the header also includes information that specifies a number of portions of program instructions that are to be loaded by the second computer system before executing said first portion of the program instructions.

23. The method of claim 1, wherein the data further includes identification information that is usable to identify at least a portion of the program instructions.

24. The method of claim 1, wherein the timing information includes relative timing information.

25. The method of claim 1, wherein said transmitting is performed according to a User Datagram Protocol (UDP).

26. The method of claim 1, wherein the first computer system performs said transmitting in response to receiving a request from a browser application of the second computer system.

27. A computer-implemented method, comprising:
a computer system receiving data from a computer network, wherein the data includes timing information and program instructions, wherein the program instructions define one or more computer programs that are executable by the computer system, wherein the timing information indicates a first time by which loading of at least a first portion of the program instructions is to be completed by the computer system;
the computer system starting to load the first portion of the program instructions; and
the computer system determining if the first portion of the program instructions has completed loading by the first time;
wherein the first portion of the program instructions includes platform-independent code that is configured for execution by a virtual machine on the computer system.

28. The method of claim 27, further comprising:
in response to determining that the first portion of the program instructions has completed loading by the first time, the computer system executing the first portion of the program instructions.

29. The method of claim 28, wherein said executing the first portion of the program instructions includes:
compiling the platform-independent code to obtain second program instructions executable by a processor of the computer system; and
the processor executing the second program instructions.

30. The method of claim 28, wherein said executing the first portion of the program instructions includes:
executing a virtual machine on the computer system; and
the virtual machine executing the platform-independent code.

31. The method of claim 28, wherein said executing the first portion of the program instructions includes:
translating the platform-independent code to obtain second program instructions executable by a processor of the computer system; and
the processor executing the second program instructions.

32. The method of claim 28, wherein the platform-independent code forms part of an applet.

33. The method of claim 28, wherein the platform-independent code is Java byte code.

34. The method of claim 28, wherein the data includes a header that specifies a number of additional portions of the program instructions to be loaded before performing said executing the first portion of the program instructions;
the method further comprising: the computer system determining if the additional portions of the program instructions have been loaded;
wherein said executing the first portion of the program instructions is performed after the additional portions of the program instructions have been loaded.

35. The method of claim 28, wherein the data further includes a plurality of identifiers that identify selected portions of the program instructions;

the method further comprising: the computer system determining if loading of the selected portions corresponding to the plurality of identifiers has completed;

wherein said executing the first portion of the program instructions is performed after the selected portions have been loaded.

36. The method of claim 27, wherein the data further includes time-aware media information, wherein the time-aware media information includes one or more of the following: audio information, image information, and video information.

37. The method of claim 27, further comprising:

in response to determining that the first portion of the program instructions has completed loading by the first time:

the computer system compiling the first portion of the program instructions; and the computer system executing the compiled first portion.

38. The method of claim 27, further comprising:

the computer system performing one or more processing operations to handle a late loading error if the loading of the first portion of the program instructions is not completed by the second time.

39. A non-transitory computer-readable memory medium that stores program code, wherein the program code, if executed by a computer system, further causes the computer system to:

receive data from a computer network, wherein the data includes program instructions and timing information, wherein the program instructions define one or more platform-independent computer programs that are executable by a virtual machine of the computer system, wherein the timing information specifies a first time the virtual machine of the computer system is to start executing at least a first portion of the program instructions, wherein the timing information also indicates a load-complete time by which loading of at least said first portion of the program instructions is to be completed by the virtual machine on the computer system.

40. The memory medium of claim 39, wherein the data further includes time-aware media information, wherein the time-aware media information includes one or more of the following: audio information, image information, and video information.

41. The memory medium of claim 40, wherein the time-aware media information is formatted according to one or more of an MPEG-1 format, an MPEG-2 format, and an MPEG-4 format.

42. The memory medium of claim 40, wherein the time-aware media information includes a scene graph.

43. The memory medium of claim 39, wherein the program instructions are compressed.

44. The memory medium of claim 43, wherein the data further comprises compression information, wherein the program code, if executed by the computer system, further causes the computer system to:

identify a decompression scheme to apply to the program instructions based on compression information included in the header; and apply the decompression scheme to the program instructions to produce decompressed program instructions.

45. The memory medium of claim 39, wherein the data further comprises a plurality of identifications, wherein each identification of the plurality of identifications is usable to identify a corresponding one of a plurality of portions of the program instructions.

46. The memory medium of claim 45, wherein each of the plurality of portions of the program instructions is a Java class, wherein a first of the Java classes includes one or more of a variable and a method.

47. The memory medium of claim 39, wherein the data includes a header, wherein the header includes the timing information.

48. The memory medium of claim 47, wherein the header comprises size information which indicates a size of the header.

49. The memory medium of claim 39, wherein the timing information specifies a load-start time that precedes the first time, wherein the load-start time indicates a time that the virtual machine is to start loading one or more portions of the program instructions.

50. The memory medium of claim 49, wherein one or more of the first time and the second time are relative times.

51. The memory medium of claim 39, wherein the first time includes a relative time.

52. The memory medium of claim 39, wherein the timing information includes a timestamp that specifies the first time.

53. The memory medium of claim 39, wherein the data includes a plurality of packets.

54. The memory medium of claim 39, wherein the data further includes authentication information, wherein the authentication information is usable by the computer system to authenticate at least a portion of the program instructions.

55. The memory medium of claim 39, wherein the data further comprises an identification (ID) which identifies the first portion of the program instructions.

56. The memory medium of claim 39, wherein the data further comprises version information which indicates a version of at least the first portion of the program instructions, wherein the version information indicates a major version number and a minor version number.

57. The memory medium of claim 39, wherein the data further includes error correction information, wherein the program code, if executed by the computer system, further causes the computer system to:

identify an error correction scheme to apply to the byte code based on identification information; and apply the error correction scheme to the program instructions to produce corrected program instructions.

58. The memory medium of claim 39, wherein the data further includes identification information associated with the first portion of the program instructions, wherein the identification information indicates whether the first portion of the program instructions is an object file or a class file.

59. The memory medium of claim 39, wherein the data is formatted according to a Real-time Transport Protocol (RTP).

60. A server computer system comprising:

a processor; and a memory that stores program code, wherein the program code, if executed by the processor, causes the processor to transmit a data stream to a client computer system via a computer network;

wherein the data stream includes first program instructions and first timing information, wherein the first program instructions define one or more platform-independent computer programs executable by a virtual machine on the client computer system, wherein the first timing information indicates a time by which loading of the first program instructions is to be completed by the client computer system.

61. The system of claim 60, wherein the data stream also includes media information, wherein the media information includes one or more of audio information, image information, and video information.

62. The system of claim 61, wherein the data stream is formatted according to one or more of a Real-time Transport Protocol (RTP), an MPEG-1 format, an MPEG-2 format, and an MPEG-4 format.

63. The system of claim 60, wherein the computer network includes one or more wireless links.

64. The system of claim 60, wherein the computer network includes the Internet.

65. The system of claim 60, wherein the client computer system stores second program instructions that are executable on the client computer system to implement the virtual machine;
wherein the virtual machine is configured to execute the first program instructions, wherein said loading of the first program instructions includes loading the first program instructions into the virtual machine.

66. A computer-implemented method, comprising:
a computer system receiving a data stream from a computer network, wherein the data stream includes program instructions and timing information associated with the program instructions, wherein the program instructions define one or more platform-independent computer programs that are executable by a virtual machine on the computer system;
the computer system determining a first time indicated by the timing information; and
the computer system completing a loading of the program instructions at or before the first time.

67. The method of claim 66, further comprising:
the computer system determining a load-initiation time indicated by the timing information, wherein the load-initiation time precedes the first time;
the computer system initiating said loading of the program instructions in response to a determination that the load-initiation time has passed.

68. A non-transitory computer-readable memory medium that stores program code, wherein the program code, if executed by a first computer system, causes the first computer system to:
transmit data through a computer network, wherein the data includes program instructions and timing information, wherein the program instructions define one or more platform-independent computer programs that are executable by a virtual machine;
wherein the timing information indicates a first time by which loading of at least a first portion of the program instructions is to be completed by an instance of the virtual machine on a second computer system coupled to the computer network.

69. The memory medium of claim 68, wherein the data also includes media information, wherein the media information includes timestamps and presentation information, wherein the presentation information includes one or more of audio information, image information, and video information, wherein the timestamps specify times that the second computer system is to act on portions of the presentation information.

70. The memory medium of claim 68, wherein the data is formatted according to one or more of a Real-time Transport Protocol (RTP), an MPEG-1 format, an MPEG-2 format, and an MPEG-4 format.

* * * * *